TELEPHONE HEADSET WITH ADJUSTABLE SPEECH TUBE

Filed Nov. 4, 1965

INVENTORS
H. W. BRYANT
N. C. HAZELL
L. W. MOSING
BY [signature]
ATTORNEY

United States Patent Office 3,440,365
Patented Apr. 22, 1969

3,440,365

TELEPHONE HEADSET WITH ADJUSTABLE SPEECH TUBE

Herbert W. Bryant, Middletown, Norman C. Hazell, Freehold, and Lionel W. Mosing, Springfield, N.J., assignors to Bell Telephone Laboratories, Incorporated, New York, N.Y., a corporation of New York Filed Nov. 4, 1965, Ser. No. 506,310
Int. Cl. H04m 1/05
U.S. Cl. 179—156 6 Claims

ABSTRACT OF THE DISCLOSURE

A telephone headset is disclosed consisting of a housing, containing the transmitter and receiver, a two-piece speech tube connected to the housing, and an acoustic ear insert on which the housing is mounted. The housing can rotate on the ear insert, the fitting permitting this also constituting a part of the acoustic passage between the inner ear and the receiver. The inner portion of the speech tube is rigid and swivelably mounted to the housing. The outer piece is curved and also slidable and turnable with respect to the inner portion. The geometry allows adjustment of the headset to almost any wearer's head configuration.

This invention relates to transmitter-receiver units of the type supported during use upon the head of the user, and, in particular, to headsets worn by telephone operators.

An increasing concern for operator comfort as well as equipment performance has prompted much recent effort to improve radio and telephone headsets. Broadly, the two prime causes of wearer discomfort are the weight and bulk of the set, and the distribution of whatever weight is involved. Significant weight and size reductions are achieved by replacing the heavy magnetic core receivers and carbon-type transmitters with miniature balanced armature transducers of the type routinely used in hearing aid devices. These transducers operate advantageously in conjunction with acoustic pick-up tubes, and this expedient has also been employed in the telephone headset art to reduce weight.

However, several facets of the weight distribution problem have not been solved satisfactorily. Moreover, other important and persistent problems, including pick-up tube positioning limitations and the manner of support for the whole headset, require better solutions, preferably ones which in fact further reduce the weight distribution problem instead of complicating it.

One of the problems relates to headbands per se, which are necessary with most headset designs to provide the needed support. Headbands are inherently bulky, add to the headset's cost, and must be maintained and stored. For some applications as, for example, when other heavy headgear must also be worn, headbands are frequently inconvenient or unsuitable. Moreover, to a large number of hairdress-conscious women operators, headbands of any type are anathema because of their bulk and tendency to snag and disturb the hair. One typical substitute for the headband is a supportive lanyard, but these lend only loose support and consequently the set is not held stably in the required position. Other methods of avoiding headband support include suspending the set from a loop placed around the ear, similar to eyeglass frames, or suspending the set from the eyeglass frame itself. The eyeglass clip method, however, tends to shift the optical axis, and is limited in any case to persons who wear glasses. The over-ear loop lacks stability and also disturbs the optical axis if glasses are also worn.

Another general problem involves the support or suspension mechanisms for positioning the headset in accordance with the wearer's mouth-ear geometry. One aspect is that conventional supports incorporated in headset designs in an effort to make the set adaptable to widely varying head geometry and wearing preferences, employ very complicated and bulky adjustment features. Simplified support designs have sacrificed at least to some extent the adjustability. Further, earlier support designs do not take into account adequately certain wearer preferences, particularly of telephone operators, which include location of the supportive pressure, manner of putting on and removing the set and movement of the transmitter independently of the receiver.

A related problem is that the positions in which operators are willing, or tend, to wear a given headset do not coincide necessarily with the position in which the set performs best. To treat this problem and the preceding ones simultaneously, requires acoustic refinements not found in prior art devices.

A further problem, principally one of acoustics but bearing importantly on operator comfort, relates to the receiver-to-ear seal. Tight seals are desirable from the transmission standpoint, but are achieved in today's headsets with considerable sacrifice in operator comfort.

Another drawback of headsets using acoustic pick-up tubes relates to the effects created under certain circumstances by operator speech sounds such as *b* and *p*. The operator's breath which produces these sounds is a strong puff that impinges full-force upon the tube entrance normally maintained about three-fourths of an inch in front of the mouth. The sidetone this creates is audible to operator and calling party; and at high levels is unpleasant and distracting to both. The effect is minimal if, as with sets having conventional size earcaps, there are sufficient sound leakage losses inherently present in the set. However, the problem becomes acute if a receiver of high efficiency is employed. In such case the sidetone effects of *b* and *p* sounds compel the operator to place the tube entrance farther from the mouth or to use a reduced speech level. Either action weakens the transmission level and makes reception of operator speech by the calling party difficult.

Accordingly, a general object of the invention is to reduce substantially the degree of discomfort incident to wearing a telephone headset.

Another object of the invention is to improve the acoustic performance of telephone headsets.

A further object of the invention is to simplify the positionability of the several elements in a typical operator's headset.

A further object of the invention is to reduce the absolute number of elements necessary in a headset.

A still further object of the invention is to eliminate the unpleasant sidetone effects caused by puff sounds in a headset using an acoustic pick-up tube.

These and other objects are accomplished in accordance with the invention in a telephone headset in which a single, compact housing, containing the transducers and all connections and supporting a widely adjustable acoustic pick-up tube, is suspended from an acoustic earpiece inserted in the operator's ear.

In one embodiment of the invention, the housing is rotatably mounted on the earpiece. The speech tube is mounted in a ball-joint within the housing to permit adjustments in a large circular arc. Further rotative and longitudinal adjustments are achieved with a slide feature. The headset cord connector is integral with the cap to the housing, which reduces bulk and weight and facilitates cord replacement. The housing, speech tube and cord are thus placed well out of the operator's line of vision and away from her work area.

Advantageously, the plastic ear insert is molded to fit the particular ear geometry of the user. This expedient, well known in the hearing headset art, achieves not only the expected superior receiver-to-ear seal, but because of its snug fit provides a point of suspension for the headset proper that is secure, stable and surprisingly comfortable.

In accordance with another aspect of the invention, a puff screen is mounted at the entrance to the acoustic pick-up tube to reduce the sidetone effects caused principally by the sounds of *b* and *p*. The screen is an extended coil spring with inwardly-extending helical end portion and, advantageously, a plastic coating. The acoustic energy of the *b* and *p* sounds is dissipated by a turbulence produced when the waves impinge on the spring, which allows only a small fraction of these waves to pass at their original velocity.

Accordingly, a feature of the invention relates to suspending and acoustically coupling an operator's headset from an acoustic ear insert.

A further feature of the invention lies in employing a custom-molded plastic acoustic ear insert as a support for an operator's headset, on which the latter may be rotatably positioned.

A still further feature of the invention resides in a combination of added adjustments enabling the pick-up tube to be positioned and retained at any selected position adjacent the operator's mouth without impairing the acoustic couplings.

A still further feature of the invention involves a spring-like puff screen that alleviates the distortive effects of sounds such as *b* and *p*.

Other objects and features of the invention will be readily discernible in the description to follow of an illustrative embodiment thereof and in the drawing in which.

Figures 1, 2, 3, 6:
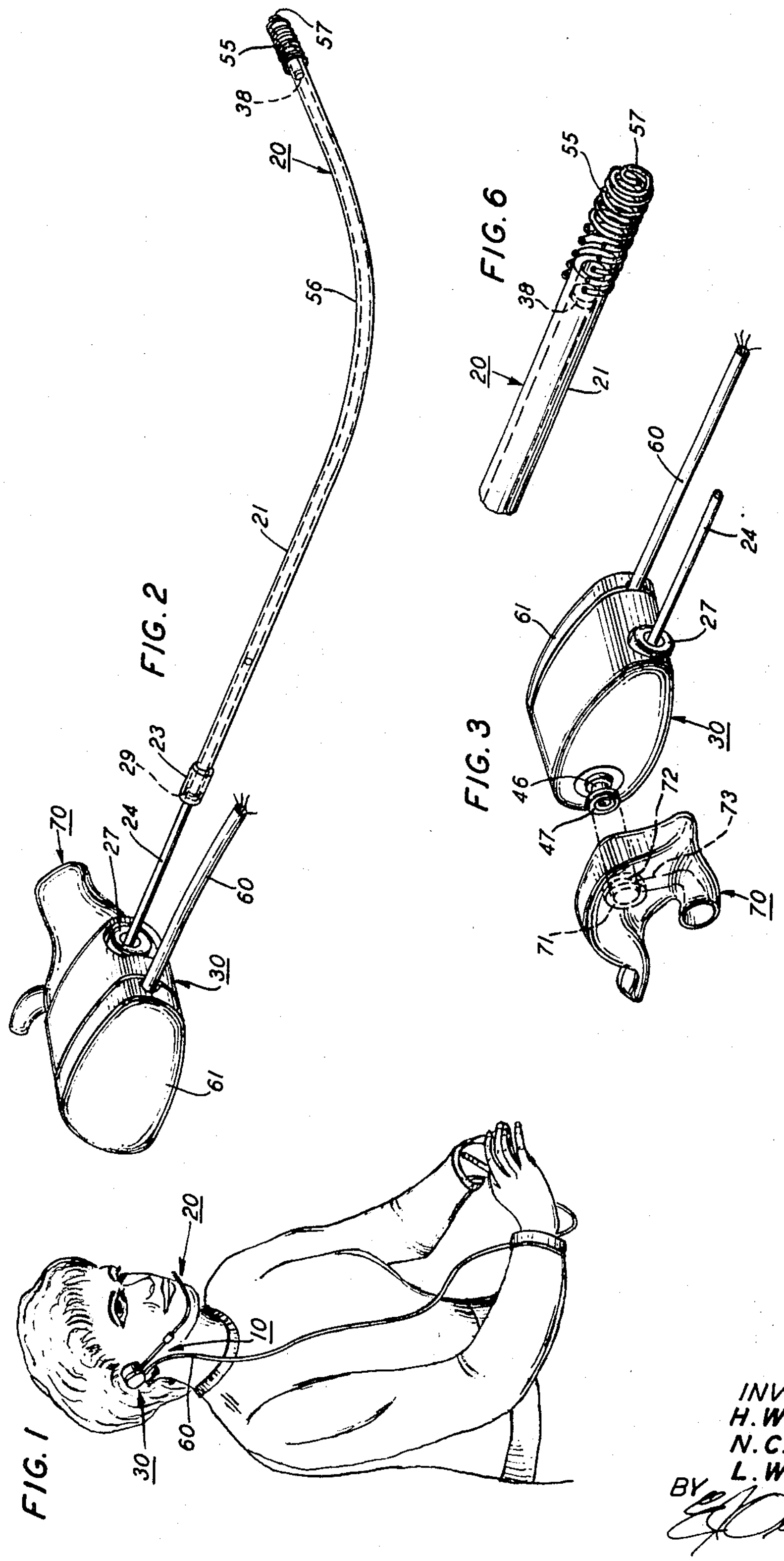
FIG. 1 shows a headset in place upon an operator.
FIG. 2 is a perspective of the headset.
FIG. 3 is a perspective showing the ear insert and the mounting coupling.
FIG. 6 is a side perspective of a distortion reducing screen.

FIG. 1 shows a headset embodying the inventive concepts in place on an operator and designated generally as 10. Essentially, headset 10 comprises acoustic pick-up tube 20 and housing 30. A cord 60 attaches to housing 30. Pursuant to a fundamental aspect of the invention, headset 10 is suspended completely from an acoustic ear insert or earpiece 70, shown in FIG. 3 and described in detail later. This manner of suspension eliminates need for head straps or other supportive structure.

Figures 4, 5:
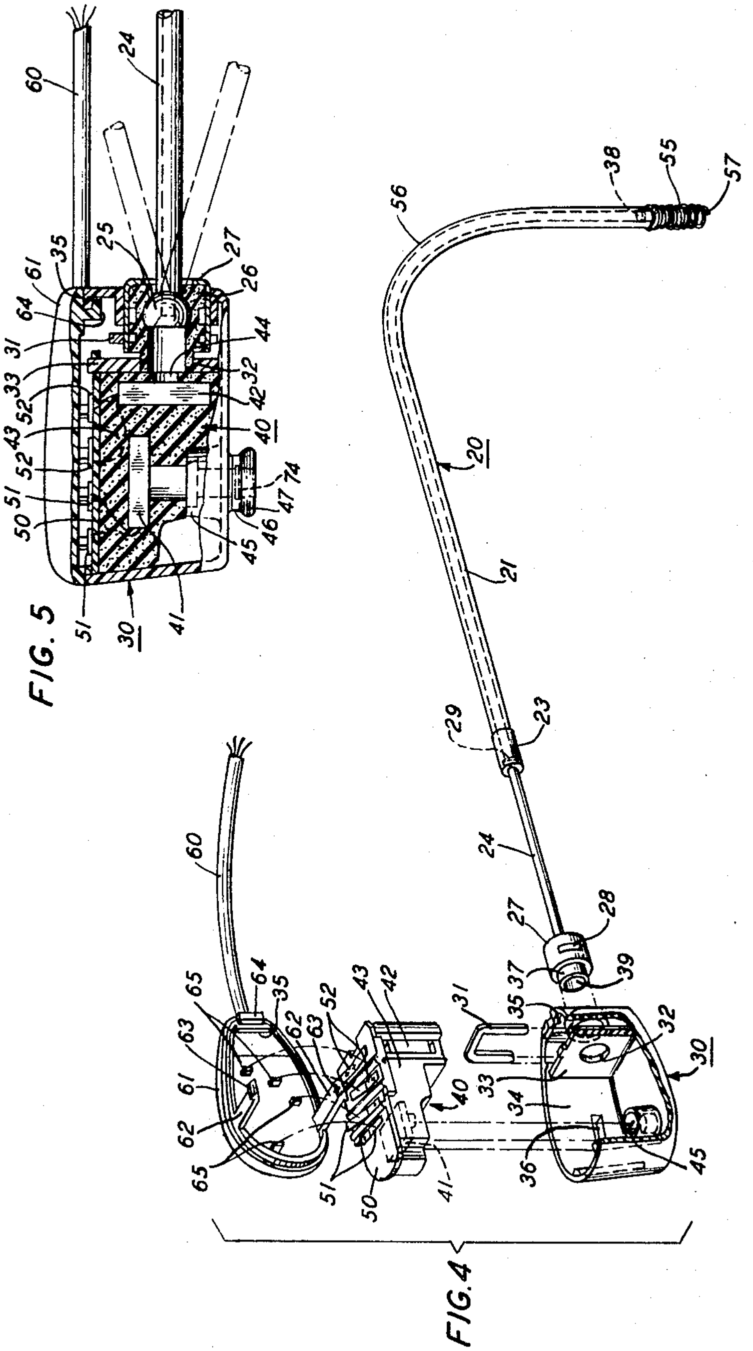
FIG. 4 is a perspective in expanded form showing the elements of the headset.
FIG. 5 is a perspective view in partial cutaway of the housing and acoustic tube mounting.

As shown in FIGS. 2 and 4, pick-up tube 20 comprises a plastic tube 21 at the end adjacent the operator's mouth and a rigid tube 24 at the other end. Tube 21 may be made with cellulose acetate and advantageously includes a straight section followed by a curved section 56 near the wearer's mouth. Tube 24 is preferably of stainless steel and includes an acoustic ball-joint 25 at one end. Ball-joint 25 is made advantageously of stainless steel or a suitable lightweight material and, as in FIG. 5, provides a mounting for tube 21. Ball-joint 25 joins the housing in a slight interference in a resilient fitting 26 of neoprene or an equivalent, which serves as a frictional mounting socket. The fitting 26 is enclosed in a retainer 27 that seats in housing 30, and that includes a longitudinal acoustic passage 39. Tube 20 may be swivelled within the socket through a considerable circular arc, e.g., 15 degrees. A wide range of adjustments of the end of speech tube 21 with respect to the operator's mouth is thus possible, even without changing the position of housing 30 on earpiece 70.

Pursuant to the invention, tube 24 telescopes and rotates within the straight portion of tube 21 in a light friction fit therewith. A metal ferrule 23 is crimped to plastic tube 21 in order to retain an acoustic and mechanical sealing washer 29 around tube 21, in a substantial friction fit. The curved section 56 together with the ball-joint feature allows for jowl clearance for tube 21 so that the open end thereof can always be positioned next to the wearer's mouth. The longitudinal and rotational adjustment in conjunction with curved section 56 allows a full range of positions to accommodate any ear-to-mouth geometry for either male or female wearers. Tube 21 may be removed for replacement easily by a light pulling, but will retain stably any position of adjustment in which it is placed. Advantageously, tube 21 may be transparent so that any dust or foreign matter accumulation can be spotted and removed.

Pursuant to one aspect of the invention, a screen 55 covers the open end of plastic tube 21 to overcome sidetone effects caused particularly by *b* and *p* speech sounds. As shown in FIG. 2 and again in FIG. 6 in greater detail screen 55 is an elongated coil with a coned-in helical end 57. Spring 22 is made advantageously, of steel music wire coated with a hard smooth plastic. The adjacent coils are closely spaced and the end helix spirals into a center point. Spring 55 serves to reduce the puff distortions by causing a turbulence in the speech air stream which helps reduce its forward velocity and dissipates some of its energy. The puff sounds are further reduced by a sintered disc 38 at the end of the tube by means of dissipation.

While the described puff screen may, of course, be employed to advantage on any acoustic pick-up tube, it is especially valuable to the instant invention because it helps make practicable the suspending of the headset from an acoustic ear insert. The tight acoustic seal between insert and ear transmits sound essentially without loss, so that without the screen the acoustic blasts to the ear resulting from the puffs would be severe.

As seen in FIG. 4, a disc of porous material 38 such as sintered stainless steel is situated in tube 21 inwardly of screen 55, to damp resonant peaks resulting from standing waves. Retainer 27 is attached and acoustically sealed to housing 30 by a clip 31 that fits through a pair of opposed slots 28 in the sides of the retainer. A flange 37 on fitting 26 snugly seats to an aperture 32 of partition wall 33 within housing 30. To the other side of wall 33 is a recess 34 into which transducer mounting unit 40 fits.

Unit 40 consists of a receiver-transducer 41 and transmitter-transducer 42, advantageously mounted at right angles to each other and individually surrounded by a form-fitting cushion of rubber-like material 43. Transducers 41 and 42 are of the miniature balanced armature variable reluctance type. This transducer can be obtained either as a receiver or as a microphone. The receiver, with the proper type coupling, can develop sound pressures in the ear that can be significantly higher than those produced by conventional receivers for the same electrical input. In the form of a microphone used in conjunction with an amplifier as, for example, that described in W. J. Brown patent application Ser. No. 455,-714, filed May 14, 1965, and assigned to applicant's assignee, the transducer can deliver to the telephone line electrical power higher than that of the headset carbon microphone widely used in the industry. The impedance of transmitter 42 is a few thousand ohms at 1000 c.p.s.; that of receiver 41 is a few hundred ohms at 1000 c.p.s.

Apertures 44 are provided in the cushion 43 at two points. One point coincides with the acoustic aperture 32 that passes acoustic waves through housing 30 from tubes 21 and 24. The second lines up with an acoustic aperture 45 in housing 30, as shown in FIG. 4, that connects to earpiece 70. Aperture 45 occurs throughout the length of an acoustic fitting 46 that is mounted on housing 30 opposite the terminus of cord 60, and to which in accordance with the invention the supportive earpiece is fastened.

Unit 40 and terminal block 50 comprise in effect a single module that requires only manual insertion and not leads, that facilitates manufacture and that allows easy field replacement of transducers if necessary, from an on-hand supply. By this construction, enough room is saved in housing 30 to include other devices therein as, for example, a clock-suppressing varistor if desired.

A top transducer mounting unit 40 is a terminal block 50 that includes a first and a second pair of spring connectors 51 and 52, advantageously having a high palladium content. Spring connectors 51, 52 have sufficient tension to accommodate the various fits between the houseing and the end cap. Block 50 is formed of a stiff, glass fiber-filled nylon resin. Electrical connections (not shown) are effected between connector pair 51 and receiver-transducer 41, and also between connector pair 52 and transmitter-transducer 42.

An end cap or cover 61 is molded directly onto the end of cord 60. A plurality of contacts—in this instance, four—are connected to the conductors of cord 60 and also modled directly into cap 61. Each contact 65 lines up with and touches a separate one of the spring contacts of connectors 51 and 52. Pursuant to an important aspect of the invention, molding of cap 61 directly to cord 60 eliminates need for a stayband, which reduces weight and saves space. Cap 61 has a locking tab 64 which catches beneath a lip 35 in housing 30. A pair of legs 62 each with an outwardly-extending end nub 63 are molded integrally with cord 60. Legs 62 fit into recess 34 and the nubs 63 lock into correseponding grooves 36 in the sides of housing 30 to effect the final closure generally of cap 61 upon housing 30. Cap 61 fits onto housing 30 so that cord 60 is parallel to tube 24. This makes it possible to wear the set comfortably upon either ear.

In accordance with a prime aspect of the invention, as shown in FIG. 3, support for the headset 10 is given by acoustic earpiece or ear insert 70. Earpiece 70 is custom-molded to fit the outer ear cavities of the wearer and includes an acoustic passage 73 between the innermost end and its outer coupling 71. An annular groove 72 around the inner diameter of coupling 71 allows earpiece 70 to be snapped on over a lip 47 on fitting 46 in a light interference fit. When so attached, housing 30 is rotatably adjustable with respect to earpiece 70. A disc of porous sintered steel 74 is lodged inwardly of lip 47 to suitably damp the response peaks of the acoustic system of the receiver. Separate plug inserts must be molded for left and right ears. In practice, each wearer is responsible for his or her own inserts, including storage and occasional cleaning.

Another important advantage of supporting the headset from an ear insert is that there is little or no low overhanging mass involved, to distract or disturb the operator. Also, since the entire headset is held essentially to the ear, no discernible movement of inertia can be produced by turning of the head. Moreover, what little torque is applied to the insert by the movement of the headset and speech tube is in the direction of the outer ear helix which serves to secure it further. Additionally, the unobtrusiveness of the set resulting from its lightness and close fit to face, contributes much to its acceptance by telephone operators and consequently to better operator service.

The operation of headset 10 is simple, involving simply snapping together of housing 30 and of insert 70, and then placing of insert 70 into position in the ear and finally adjusting the speech tube to position the puff screen 55 with respect to the wearer's mouth in accordance with the various above-described inventive adjustments. As the entire headset, including a portion of the cord need weigh only about 18 grams, it is unnecessary to support it any way other than that described. However, some operators prefer to support some of the weight of cord 60 with a neck lanyard (not shown) worn in necklace fashion that fastens to cord 60 about two feet away from housing 30. The acoustic leakage losses to the outside are extraordinarily low, due, in accordance with the invention, to the compact tight construction throughout. With the puff screen located about three-fourths of an inch from the user's mouth, a high level of performance will occur regardless of the specific adjustment fit employed.

While several embodiments of the inventive concept have been shown and described, it is to be expressly understood that further changes and modifications may be made without departing from the spirit and scope of the invention.

What is claimed is:

1. A telephone headset comprising: a transmitter, a receiver, and means for housing said transmitter and receiver; an acoustic ear insert comprising a rigid plug-like body with an outer surface, an outer ear helix, an ear canal extension and an acoustic through-passage running from said outer surface and including said extension; means for supporting said housing means upon said ear insert outer surface for rotation about an axis which when the insert is being worn is substantially normal to the side of the wearer's head; and means including said support means for acoustically connecting said through-passage and said receiver.

2. A telephone headset in accordance with claim 1 further comprising an acoustic tube having a rigid inner portion with a ball-joint at one end thereof and a curved outer portion slidably and rotatably mounted upon said rigid portion, and means including compliant material mounted adjacent said transmitter for frictionally and swivelably mounting said ball-joint in said housing, whereby said acoustic tube outer portion is selectively positionable with respect to the wearer's mouth without disturbing said headset housing and said ear insert.

3. A headset in accordance with claim 1 further comprising a rigid straight inner acoustic tube, means swivelably retaining an end of said inner tube within said housing, means acoustically connecting said inner tube and said transmitter, a compliant outer acoustic tube, means including a straight portion of said outer tube for slidably and rotatably mounting same upon said inner tube in a slight interference fit, and means including a curved end portion of said inner and outer tubes for effecting an adjustable clearance between said inner and outer tubes and the user's jaw, whereby the entrance of said outer tube is positioned next to the user's mouth regardless of head shape.

4. A headset in accordance with claim 3 wherein said outer acoustic tube further comprises means, including an elongated open wound steel spring axially aligned with and fixedly mounted on said tube end and having an inwardly-directed helical outer end, responsive to high-energy bursts of acoustic signals impinging thereon for creating an air turbulence thereby to dissipate said energy and reduce sidetone effects of said bursts.

5. A headset in accordance with claim 1 wherein said housing means further comprises a container portion for supporting said transmitter and said receiver, a contact board including a plurality of contact springs, a plurality of electrical connections between said contact springs and said transmitter and receiver means, and a cap portion comprising a plurality of electrical contacts for effecting contact with respective ones of said contact springs.

6. A telephone headset in accordance with claim 1, wherein said housing support means comprises a lipped fitting, and said acoustic passage at said ear insert outer surface includes a corresponding annular groove to accommodate said lipped fitting in a light interference fit, thereby to enable said ear insert to be snapped on and off of said housing.

References Cited

UNITED STATES PATENTS

| | | | |
|---|---|---|---|
| 2,904,640 | 9/1959 | Dreher et al. | 179—156 |
| 2,566,313 | 9/1951 | Cates | 181—22 |
| 3,184,556 | 5/1965 | Larkin | 179—156 |
| 3,280,273 | 10/1966 | Flygstad et al. | 179—156 |

WILLIAM C. COOPER, *Primary Examiner.*